(12) United States Patent
Martin

(10) Patent No.: US 6,263,368 B1
(45) Date of Patent: *Jul. 17, 2001

(54) NETWORK LOAD BALANCING FOR MULTI-COMPUTER SERVER BY COUNTING MESSAGE PACKETS TO/FROM MULTI-COMPUTER SERVER

(75) Inventor: Jean-Christophe Martin, Meylan (FR)

(73) Assignee: Sun Microsystems, Inc., Palo Alto, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/879,115

(22) Filed: Jun. 19, 1997

(51) Int. Cl.[7] ............................. G06F 15/173; G06F 9/00
(52) U.S. Cl. ........................ 709/224; 709/225; 709/105
(58) Field of Search .................................. 709/219, 223, 709/224, 225, 244, 105, 238, 232; 707/10; 370/232

(56) References Cited

U.S. PATENT DOCUMENTS

| | | | | |
|---|---|---|---|---|
| 4,058,838 | * | 11/1977 | Crager et al. ........................ | 358/256 |
| 4,621,359 | * | 11/1986 | McMillen ............................. | 370/235 |
| 5,097,469 | * | 3/1992 | Douglas ............................... | 714/712 |
| 5,274,782 | * | 12/1993 | Chalasani et al. ................... | 395/325 |
| 5,568,471 | * | 10/1996 | Hershey et al. .................... | 370/245 |
| 5,742,587 | * | 4/1998 | Zornig et al. ....................... | 370/235 |
| 5,774,660 | * | 6/1998 | Brendel et al. .................. | 395/200.56 |
| 5,774,668 | * | 6/1998 | Choquier et al. ................ | 395/200.53 |
| 5,784,633 | * | 7/1998 | Petty .................................. | 395/200.43 |
| 5,805,816 | * | 9/1998 | Picazo, Jr. et al. .............. | 395/200.53 |
| 5,828,847 | * | 10/1998 | Gehr et al. ....................... | 395/200.69 |
| 5,864,535 | * | 1/1999 | Basilico ............................... | 370/231 |
| 5,913,041 | * | 6/1999 | Ramanathan et al. .............. | 709/233 |
| 5,918,021 | * | 6/1999 | Aditya ................................. | 709/235 |
| 5,940,372 | * | 8/1999 | Bertin et al. ........................ | 370/238 |
| 6,003,079 | * | 12/1999 | Friedrich et al. .................... | 709/224 |

* cited by examiner

Primary Examiner—Zarni Maung
Assistant Examiner—Jason D. Cardone
(74) Attorney, Agent, or Firm—Conley, Rose & Tayon, PC; B. Noel Kivlin

(57) ABSTRACT

A message dispatch system is provided for a multi-computer server having a number of server computers connected via respective server network links. The message dispatch system, which is connectable to an external telecommunications network, includes a message dispatcher configured to receive external client requests for the multi-computer server from the external telecommunications network and to dispatch the client requests to selected server computers via the server network links. The message dispatcher is configured to determine a server to which an external client request is to be dispatched in response to parameters representative of message traffic volume on the server network links. Load balancing is performed based on parameters representative of the server network link loading, rather than, or possibly in addition to measurements on processor loading. Suitable network loading parameters can be derived by monitoring packets passing from and/or to the individual server computers. The monitoring can be performed in the dispatcher, or in a switch or a separate traffic monitor between the dispatcher and the server network links, for example.

40 Claims, 6 Drawing Sheets

NETWORK LOAD BALANCING FOR MULTI-COMPUTER SERVER BY COUNTING MESSAGE PACKETS TO/FROM MULTI-COMPUTER SERVER

BACKGROUND OF THE INVENTION

This invention relates to multi-computer servers and to load-balancing for such multi-computer servers.

The growth of network services, for example Internet or intranet services, has made significant demands on the availability and performance of Internet and intranet sites and the servers at those sites. The growth in demand is related to increasing numbers of users, the increasing complexity of applications including increasing use of audio and video, and the increasing commercial demands for better and better service.

Thus the tremendous growth of the Internet has fuelled the requirement of multi-server-architectures in order to address the performance or reliability issues of high-traffic Internet sites. Such multi-computer Internet and intranet sites provide a much higher processing power than a single computer, even a very large computer.

FIG. 1 of the accompanying drawings is a schematic representation of a client station 14 requiring access to a server station 10 via the Internet or an intranet. FIG. 2 illustrates in more detail a possible configuration of a multi-computer server 10. The multi-computer server 10 comprises a plurality of (in the present instance four) individual server computers 16.1–16.4. Each of those computers includes a network agent 18.1–18.4, respectively. The individual server computers 16.1–16.4 are connected via server network links 20.1–20.4 to a switch 22 which is connected to the Internet or intranet 12 of FIG. 1 via a link 25. Also shown in FIG. 1 is a Domain Name System (DNS) server 24, the function of which will be described later.

The server computers 16.1–16-4 operate as identical copies of each other and are able to handle all possible requests received from the Internet or intranet 12. The switch 22 connects the individual server computers 16.1–16.4 to the Internet or intranet 12. Ideally, tasks should be distributed equally among the individual server computers 16.1–16.4 to balance the overall loading of the server site 10 in order to obtain optimum performance. To achieve this, it is necessary to direct the individual requests arriving from the Internet or intranet 12 to the individual server computers 16.1–16.4.

This kind of solution assumes that each request has the same load result, and therefore fails to address the real load generated by each request. If the individual computers 16.1–16.4 had visibly different external addresses, then this would typically require the attention of the users in order to arrange for distribution of the tasks. A more practical solution from the user's point of view is to provide a system whereby the distribution of tasks among the four server computers 16.1–16.4 occurs in a transparent manner, so that the user merely needs to address the server 10 and then the distribution task is handled by the server 10.

Thus a multi-server/multi-computer server architecture as shown in FIG. 2 requires a mechanism for dispatching requests to individual server computers while preferably keeping a unique service name.

In order to achieve the distribution of tasks between multiple server computers 16.1–16.4, various approaches have been proposed in the prior art. These approaches typically employ a Domain Name System (DNS) arrangement with task distribution on a conventional 'round-robin' or 'load balancing' basis. These different approaches will be described in the following. It should be noted that traditional load balancing is a modified form of round-robin approach in which account is taken of the processor loading of the individual server computers. This conventional load balancing approach will be termed 'processor load balancing' herein.

With a Domain Name System, a DNS server 24 is provided which responds to Domain Name look-up requests by providing an appropriate server name or numerical Internetwork Protocol (IP) address (e.g. www.sun.com or 192.10.20.30, respectively).

The round robin approach is one in which the server to receive a client request for processing is determined in a cyclically sequential, or round-robin manner. This is achieved in a well known manner by changing the mapping between the service name (e.g. www.sun.com) and the IP address (e.g. ten hosts with IP addresses ranging from 192.10.20.30 and 192.10.20.40) in this cyclical and sequential manner. For example, with reference to FIG. 2, a different IP address may be given for each of the server computers 16.1–16.4 (e.g. IP1–IP4) with the next one, in rotation, of the IP addresses being returned each time the DNS look-up is performed. In this way, one quarter of the Internet requests are distributed to each of the four computers. This approach works in principle, but in practice is not particularly efficient as different requests can lead to significantly different processing requirements and traffic volumes.

The conventional processor load balancing approach makes an attempt at balancing the load between servers at a site by taking account of parameters representative of the loading of the individual server computers. This is typically achieved by using an agent 18.1–18.4 on each server computer 16.1–16.4 to monitor the loading on that computer, for example by measuring the actual CPU loading, or the number of active Transmission Control Protocol (TCP) connections, or the number of active processes at the server computer concerned. The DNS server 24 can then be arranged to monitor the individual agents 18.1–18.4 to determine the server computer loading and to take this into account when distributing tasks. The DNS server 24 will typically still use a round-robin approach, but before allocating a new task to an individual server computer 16.1–16.4, it will check the current loading of that computer as recorded by its respective agent 18.1–18.4 and may skip the server computer concerned if its current loading is excessive.

Although this conventional processor load balancing approach does provide an improvement over a simple round-robin approach, it has nevertheless been found that such a conventional processor load balancing approach is significantly less effective in optimising the balancing of the loading throughout the multiple-computer server (often referred to as a "server farm" or "server cluster") than might previously have been expected. The inventor has identified that developments in computer usage, which are requiring transfer of larger amounts of data, have the result that the monitoring of the loading of the individual server computers is no longer a good measure of the loading of the multi-computer server as a whole. With the increase in the amount of data to be returned in response to user requests, and generally the amount of data to be transmitted, the multi-computer server systems are tending to be server network link bound, rather than processor bound. As a result of this processor usage or CPU loading is becoming a less reliable measure for determining the load of the multi-computer server system. Also, as the use of User Datagram Protocol (UDP) messages becomes more and more common (for example for video files), measuring the number of active TCP ports is also becoming an unreliable measure of the loading of a multi-computer server system.

Accordingly, there is a need for improved control of message and task distribution for multi-computer servers to enable more efficient use of the available resources.

SUMMARY OF THE INVENTION

An aim of the present invention is to mitigate the performance disadvantages of prior approaches for the control of multi-computer servers as described above.

In accordance with a first aspect of the invention, there is provided a message dispatch system for a multi-computer server which comprises a plurality of server computers having respective server network links, the message dispatch system being connectable to an external telecommunications network and comprising:

a message dispatcher configured to receive external client requests for the multi-computer server from the external telecommunications network and to dispatch the client requests to selected server computers via the server network links;

the message dispatcher being configured to determine a server to which an external client request is to be dispatched in response to parameters representative of network loading on the server network links.

An embodiment of the invention thus enables load balancing to be based on the network link loading at the multi-computer server, rather than, or possibly in addition to, measurements on processor loading. Accordingly, an embodiment provides server network load balancing as opposed to the processor load balancing of the prior art. The inventors have determined that the server network link loading provides a reliable datum for controlling message distribution, and consequently task distribution, to individual server computers of a multi-computer server, for maximising or at least substantially improving the use of resources.

Preferably, a message traffic monitor is configured to monitor parameters representative of message traffic to and/or from individual server computers via the respective server network links, the message dispatcher being configured to receive the parameters from the message traffic monitor. The message traffic monitor can be part of the message dispatching system or separate therefrom.

In an embodiment of the invention, any load on the network can be measured, even the indirectly induced load (e.g. multimedia UDP streams that are not using the same protocol as the original request). Preferably, for measuring the network load, the message traffic monitor provides an accumulated count of packet length and/or an average number of packets per second and/or an accumulated count of opened connections for each system. It should be noted that the number of active TCP ports is a not a function or parameter of traffic flow or volume as this is wholly independent of UDP traffic and does not actually indicate TCP traffic flow either.

The network load counts can be taken from the examination, on the fly, of traffic passing through the dispatcher (or passing an external monitor, as appropriate). The message dispatcher then uses these counts, on the fly, to change the address contained in the packets for the address of the least, or less loaded system. The dispatcher keeps a temporary table of data flow with the changed address to ensure that successive requests belonging to the same originator are handled consistently. The counts can be based on a packet count, a byte count, or another volume or loading parameter as appropriate.

Preferably, the message traffic monitor is responsive to source address information in messages received from the server computers via the links to monitor the volume of traffic from the server computers on the respective server network links, and/or is responsive to destination information for messages dispatched by the message dispatcher to the server computers via the links to monitor the volume of traffic to the server computers on the respective server network links.

The message dispatcher can be connected directly to the server network links. Alternatively, a switch can be connected to the network server links, with the dispatcher connected directly or indirectly to the switch. In this case the message traffic monitor can optionally form part of the switch, for example for monitoring dropped message packets as a measure of network link loading. However, the message traffic monitor can be provided as part of the dispatcher or in a separate message traffic monitor unit.

Preferably, the message dispatcher is configured to modify a destination address of a received external client request for the multi-computer server from the external telecommunications network to address a selected computer server. The message dispatch system can be configured to be addressable from the external telecommunications network by messages having an address of the multi-computer server.

For a preferred embodiment of the invention the telecommunications network is the Internet, the multi-computer server is an Internet server and the messages are Internet messages.

In another aspect of the invention, there is provided a computer software message dispatch system for a multi-computer server which comprises a plurality of server computers connected via respective server network links, wherein the computer software message dispatch system is provided on a data carrier, is configured to be connectable to an external telecommunications network and comprises:

a message dispatcher configured to receive external client requests for the multi-computer server from the external telecommunications network and to dispatch the client requests to selected server computers via the server network links;

the message dispatcher being configured to determine a server to which an external client request is to be dispatched in response to parameters representative of network loading on the server network links.

In accordance with a further aspect of the invention, there is provided a message dispatch system for a multi-computer server which comprises a plurality of server computers connected via respective server network links to a common switch, the message dispatch system being connectable to an external telecommunications network and comprising:

a first message dispatcher configured to receive external client requests for the multi-computer server from the external telecommunications network and to dispatch the client requests to selected server computers via the switch and the server network links; and at least one further message dispatcher configured to receive external client requests for the multi-computer server from the external telecommunications network and to dispatch the client requests to selected server computers via the switch and the server network links;

each message dispatcher being configured to determine a server to which an external client request is to be dispatched in response to parameters representative of network loading on the server network links.

Preferably, each message dispatcher is responsive to a common set of parameters representative of the volume of message traffic on the server network links in order to coordinate message allocation. Alternatively, however, each message dispatcher can be arranged to be responsive to a respective set of parameters representative of the volume of message traffic on the server network links, each dispatcher being responsive to each other dispatcher to coordinate message dispatching.

In accordance with yet another aspect of the invention, there is provided a method of dispatching received external client requests to server computers of a multi-computer server which comprises a plurality of server computers connected via respective server network links, the method comprising:

a) receiving external client requests for the multi-computer server from an external telecommunications network;

b) determining a server to which an external client request is to be dispatched in response to parameters representative of network loading on the server network links; and c) dispatching a received client request to the determined server computer via the respective server network link.

BRIEF DESCRIPTION OF THE DRAWINGS

Exemplary embodiments of the present invention will be described hereinafter, by way of example only, with reference to the accompanying drawings in which like reference signs relate to like elements and in which.

DESCRIPTION OF THE PREFERRED EMBODIMENTS

Figure 1:
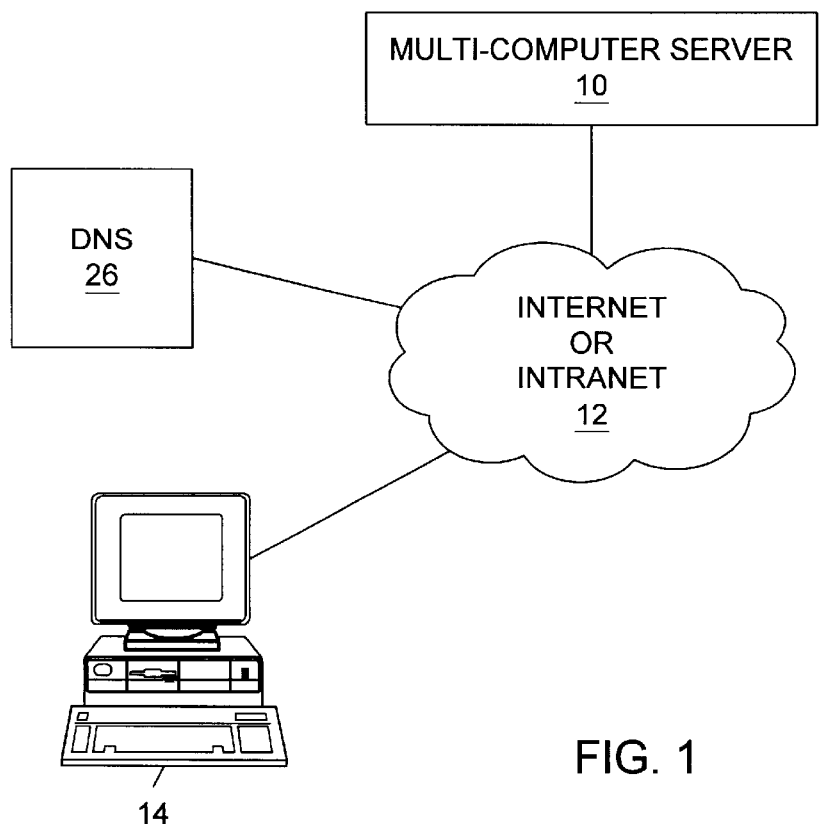
FIG. 1 is a schematic representation of a client station and server station connected via the Internet or an intranet.
Figure 2:
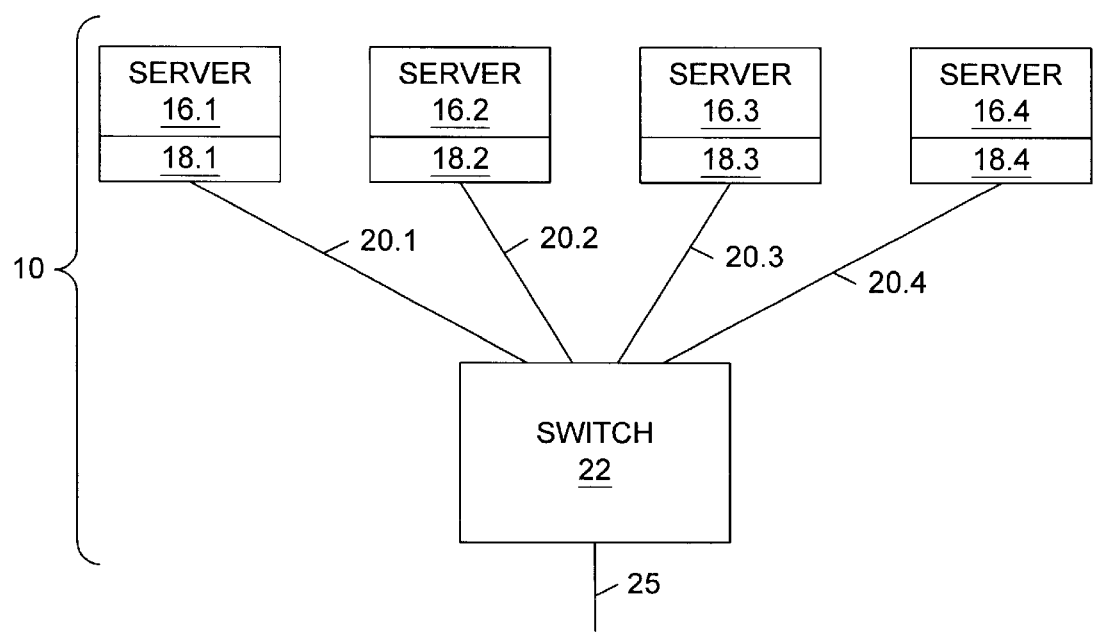
FIG. 2 is a schematic representation of a prior art multi-computer server.
Figure 3:
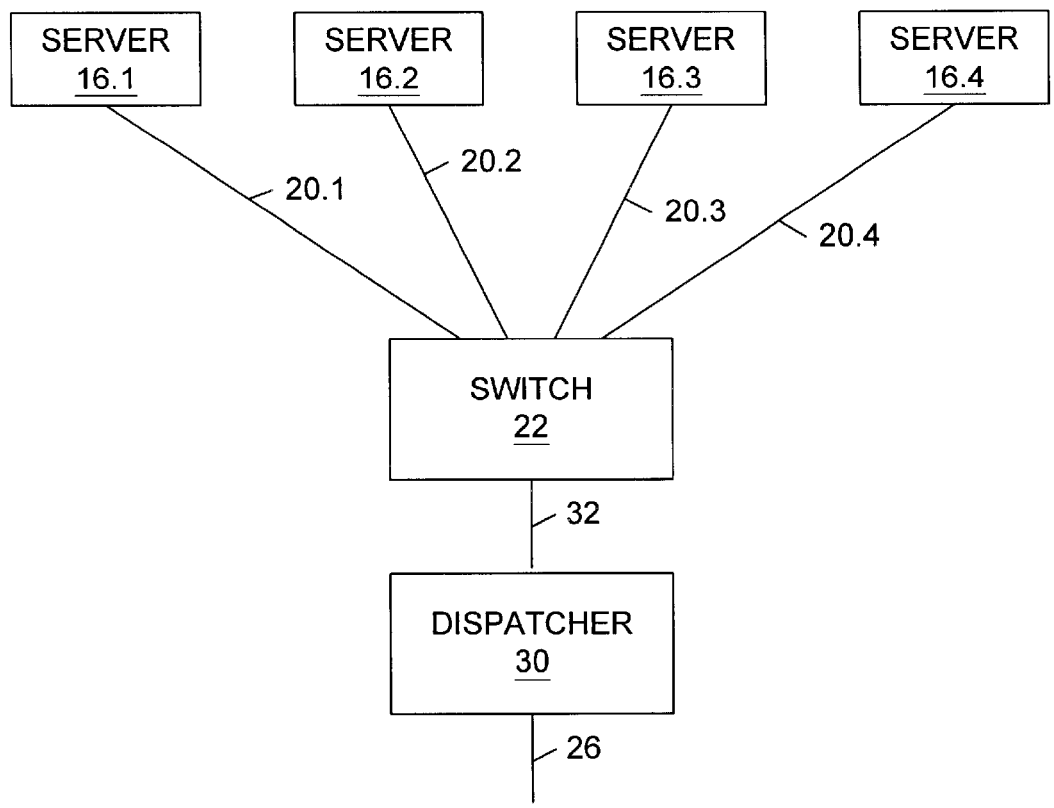
FIG. 3 is a schematic overview of a multi-computer server in which an embodiment of the invention can be implemented.

FIG. 3 is a schematic overview of a multi-computer server 33 for illustrating a first embodiment of the invention. It will be noted that the multi-computer server 33 of FIG. 3 has a generally similar structure to the prior art arrangement of FIG. 2. In particular, as shown in FIG. 3, there are four server computers 16.1–16.4 connected via respective server network links 20.1–20.4 to a switch 22. The server computers 16.1–16.4 can each be a conventional computer, for example a workstation or mini or mainframe computer of appropriate power. However, contrary to the prior art, the present invention is provided with a message dispatcher 30 based on principles different from those used in the prior art. The dispatcher 30 can be implemented on conventional computing hardware, for example a workstation or mini or mainframe computer of appropriate power. The dispatcher 30 is connected to the external network (Internet or intranet) via a link 26. The dispatcher 30 is configured to be addressable by an address for the multi-computer server and to control message dispatching to the individual server computers 16.1–16.4 on the basis of the network traffic loading on the server network links 20.1–20.4.

Employing a message dispatch system in accordance with the present invention which provides message dispatching based on, or taking account of, the traffic loading provides significant performance enhancements over prior approaches to load balancing, particularly taking into account the trend towards the use of bandwidth-intensive media applications. Typically, the requests received from external clients are relatively small, whereas the responses which need to be generated by the individual server computers 16.1–16.4 comprise relatively large files (for example, video sequences, audio information, or simply large data files). It is very difficult to predict from the in-bound request what size the out-bound response will have. In many cases, the limiting factor on overall performance of the multi-computer server is not dictated by the processing power, the number of TCP connections, or the number of active processes, but is rather a function of the volume of out-bound traffic from the individual server computers 16.1–16.4 over the server network links 20.1–20.4, respectively. Also, it is to be noted that the traffic loading on the network links 20.1–20.4 is not directly related to the number of TCP connections, as an increasing proportion of the data traffic is in the form of UDP transmissions. Typically, video information is sent using UDP, as opposed to TCP transmissions.

Figure 4:
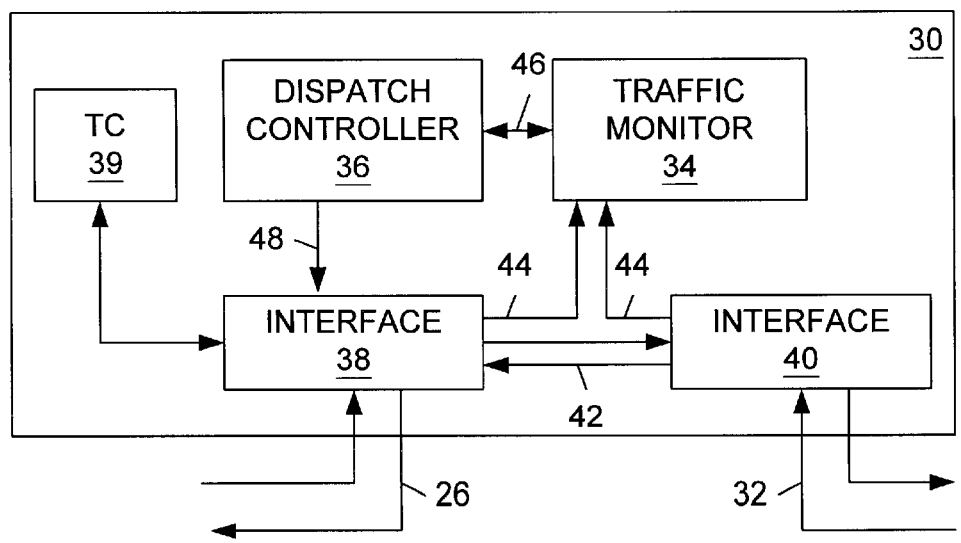
FIG. 4 is a schematic representation of an example of an embodiment of the present invention.
Figure 5:
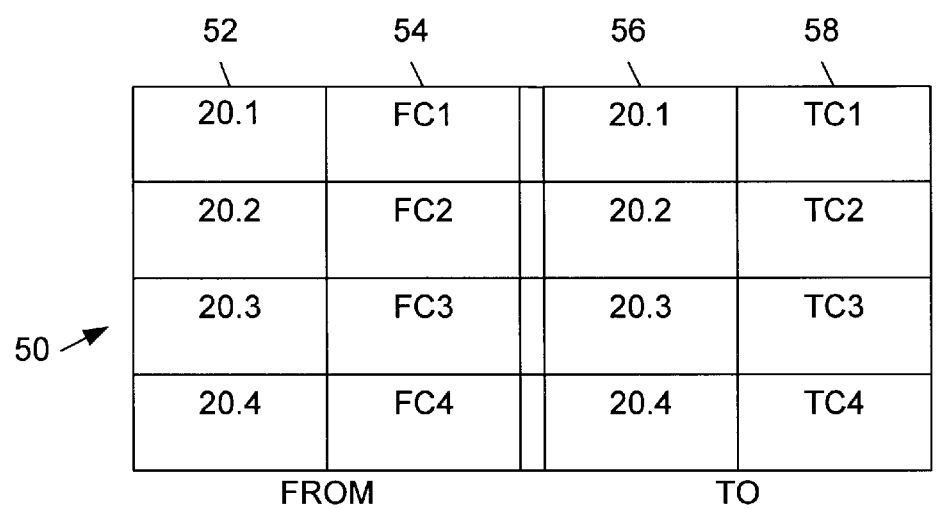
FIG. 5 is a schematic representation of a traffic load table.

FIG. 4 is a schematic block diagram of the dispatcher 30 of FIG. 3. FIG. 4 illustrates the external Internet or intranet connection 26 which is received at an interface 38. For in-bound messages, the interface 38 unpacks the received Internet message protocol and can perform message modification under the control of a dispatch controller 36. The dispatch controller 36 controls address modification in the interface 38 via a control link 48. The dispatch controller 36 is responsive via a link 46 to a message traffic monitor 34 in the embodiment shown in FIG. 30. An interface 40 connects the dispatcher 32 to the switch 22. The traffic monitor 34 in the embodiment shown in FIG. 4 is connected to monitor message traffic received at both the interface 38 and the interface 40. The monitor 34 maintains a table 50 as shown in FIG. 5. This comprises a traffic volume indicator for traffic from the server computers 16.1–16.4 via the respective links 20.1–20.4 (for example in the present instance by maintaining a traffic count TC1–TC4 for the links 20.1–20.4, respectively). The numbers 20.1, 20.2, 20.3 and 20.4 at 52 represent the links 20.1, 20.2, 20.3, and 20.4, respectively. The traffic counts FC1–FC4 are indicated at 54 in the table 50. The monitor 34 also maintains a table showing traffic to the server computers 16.1–16.4 on the respective links 20.1–20.4 (TC1–TC3) as shown at 56 and 58 in FIG. 5.

The counts FC1–FC4 can be in, for example, the form of the number of message packets received via the links 20.1–20.4, respectively. Likewise, the traffic counts TC1–TC4 can be in the form of a count of the message packets transmitted to the individual server computers 16.1–16.4 via the respective links 20.1–20.4. In order to maintain the table 50, the traffic monitor is responsive to address data in the packets received at the interfaces 38 and 40 and simply counts the number of packets received at those interfaces.

Figure 6:
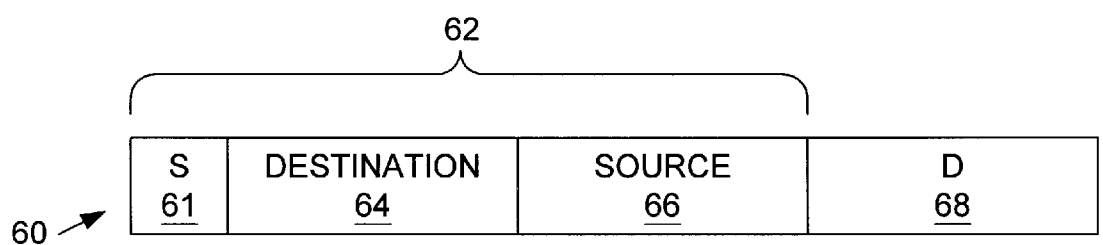
FIG. 6 is a schematic representation of a typical Internet address format.

FIG. 6 illustrates schematically, aspects of a message packet as might be received from the link 26 or the link 32. It is to be noted that FIG. 6 only illustrates aspects of the packet format which are relevant to an understanding of the present invention. As shown in FIG. 6, a packet 60 includes a header 62 including a destination address 64 and a source address 66, as well as a data portion 68. The destination and source addresses can be a combination of an Internetwork protocol (IP) address portion and a network address portion. The IP address portion relates to the external Internet address for the server computer as a whole (for example 192.10.20.30) and the network address is a physical address for the individual server computers 16.1–16.4 (for example 161–164) respectively. The IP address will contain the overall address of the multi-computer server 33. The source address will indicate the client's source address including, for example valid IP address and network address portions. For an out-bound message from the individual computers 16.1–16.4, the destination address will contain the address of the client computer to which the response is to be sent. The source address will contain the IP address for the multi-computer server 33 plus the appropriate server network address for the server computer 16.1–16.4 which generated the response. From the network address of this portion, it is therefore possible to identify the server network link 20.1–20.4 via which the response message has been transmitted.

The interface 38 dispatches an in-bound message from the link 26 under the control of the dispatch controller 36 by modifying the address to indicate the address of the server computer 16.1–16.4 which is to carry out the tasks required by the received client request. Accordingly, the destination address of a message transmitted over the internal connection 42 to the interface 40 for forwarding to the individual server computers 16.1–16.4 is contained in the header address before that message leaves the interface 38.

Accordingly, a traffic monitor 34 is arranged to access destination addresses for messages to be transmitted from the interface 38 to the interface 40 for passing to the individual server computers 16.1–16.4 via the switch 22 and the network links 20.1–20.4. It also uses this information to identify the appropriate entry 161–164 (at 56) for which the packet count TC1–TC4 should be incremented to take account of a new message packet to be sent over the network link 20.1–20.4 concerned. Similarly, the traffic monitor 34 is arranged to monitor the source address of messages received from the individual computers 16.1–16.4 to identify the appropriate entry 161–164 (at 52) in the table 50 for which the packet count FC1–FC4, respectively, should be incremented to take account of an out-bound packet.

Monitoring the number of packets provides a very simple method of monitoring the traffic flow over the individual links 20.1–20.4 assuming that the traffic is statistically linked to the number of packets. Maintaining a traffic flow indicator on the basis of packet size is not limited merely to cases where the packets have a fixed size, but can also be employed as long as there is a statistical relationship between the number of packets and the overall traffic on the individual links 20.1–20.4.

Where the statistical linking between the number of packets to be transmitted and the overall message traffic is not strong, or where a more accurate measure of traffic is required, a byte-count, as opposed to a packet-count can be maintained instead. This can be achieved, for example, where the packet header includes size information (for example a byte-count) for each packet. In this case, the traffic 34 monitor can additionally extract the byte size information 61 from the packet header and modify the information in the table 50 on this basis as opposed to the packet number information.

The information stored in the table 50 can be in the form of a byte-count, over a particular period, with the count being reset from time to time, could be in the form of a percentage indication showing percentage of maximum usage, or relative information based on the relative use of the respective links, or any other appropriate data. For example, the data stored could, for example, comprise an accumulated count of packet length and/or an average number of packets per second, as well as an accumulated count of opened connections for each system. In each case, it will be apparent to one skilled in the art that an appropriate algorithm can be used which is responsive to the traffic information identified from the interfaces 38 and 40 to generate data for storage in the table 50.

Although in FIG. 5, a table is shown which includes traffic volume data for both in-bound and out-bound messages, in most cases the in-bound requests from the external network over the link 26 will be significantly smaller than the out-bound responses from the individual server computers 16.1–16.4. In this case, as the traffic flow to the server computers 16.1–16.4 over the respective links 20.1–20.4 will be significantly less than the traffic flow in the opposite direction, an embodiment of the invention could, for example, only maintain the table 52/54 for the out-bound response packets from the server computers 16.1–16.4 over the links 20.1–20.4.

The dispatch controller 36 is responsive to the information stored in the table 50 of FIG. 5 and employs an algorithm based on the relative traffic loading as represented by the contents of the table to determine the allocation of individual in-bound client requests from the link 26 to individual server computers 16.1–16.4. The allocation is affected by changing the address to correspond to that of one of the server computers 16.1–16.4 and then forwarding the message from the interface 38 to the interface 40 for transmission to the switch 22. The switch 22 operates as a conventional telecommunications switch by using the address information contained therein to apply the packet concerned to a transmission buffer for transmission over the appropriate link.

The interface 38 can maintain a table of connections (TC) 39 to identify the routing given for a client request to a particular server computer 16.1–16.4, so that this can be used to affect the server computer allocated for future requests from the same client in accordance with the loading algorithm, if desired.

Figure 7:
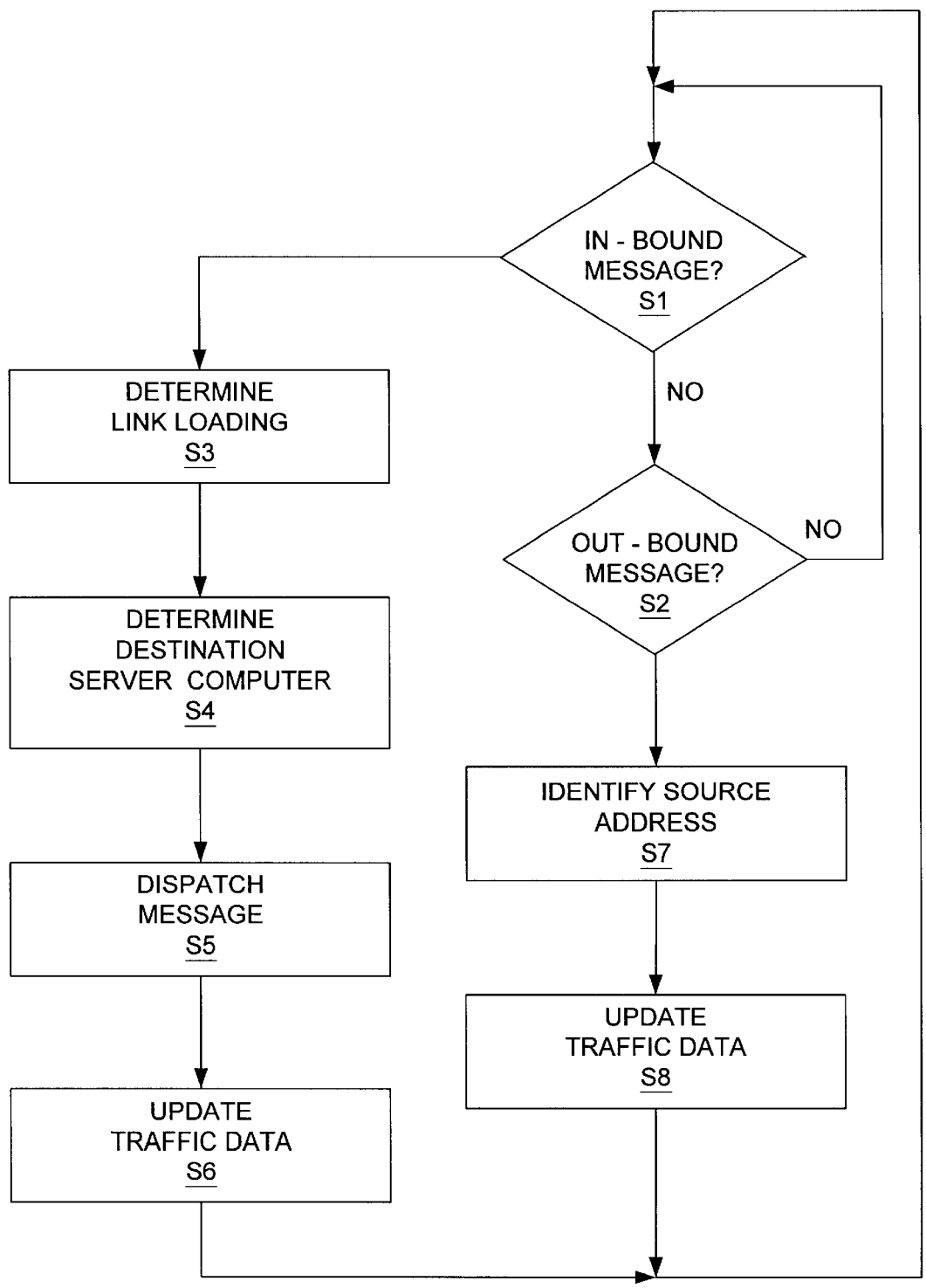
FIG. 7 is a flow diagram for illustrating the operation of the embodiment of the FIG. 4.

FIG. 7 is a summary of the operation of the message dispatcher 30 of FIG. 4.

The dispatcher waits until it either recognises an in-bound message (eg. a client request message) at interface 38 from the external network for the server computers in step S1 or an out-bound message (e.g. a response message) at interface 40 from one of the server computers in step S2.

If an in-bound message is found in step S1, the dispatch controller 36 accesses, in step S3, the traffic monitor 34 to determine the current server network link loading for the various server network links to the individual server computers.

In step S4, the data determined in step S3 is used to determine a server computer to receive the message. The determination can be made using any suitable algorithm using the traffic volume or traffic flow data. This algorithm could be based on a round-robin algorithm with skipping of the server computer in the round-robin order if the corresponding link is heavily loaded. Alternatively, it could be based solely on the relative current loading (or the relative loading over a predetermined period) on the respective server network links. Optionally, the algorithm could additionally take account of further characteristics, for example server computer loading and/or the data stored in the table of connections 39.

In step S5, the message is dispatched by the message dispatcher. This is achieved by modifying the destination address of the message to address the server computer to handle the tasks associated with the message.

In step S6, the modified destination address of the message is used to update the traffic monitor data, including, if appropriate using the size of the message to update the traffic volume data.

If an out-bound message is found in step S2, in step S7 the source address is identified in the message.

In step S8, the source address of the message is used to update the traffic monitor data, including, if appropriate using the size of the message to update the traffic volume data.

Figure 8:
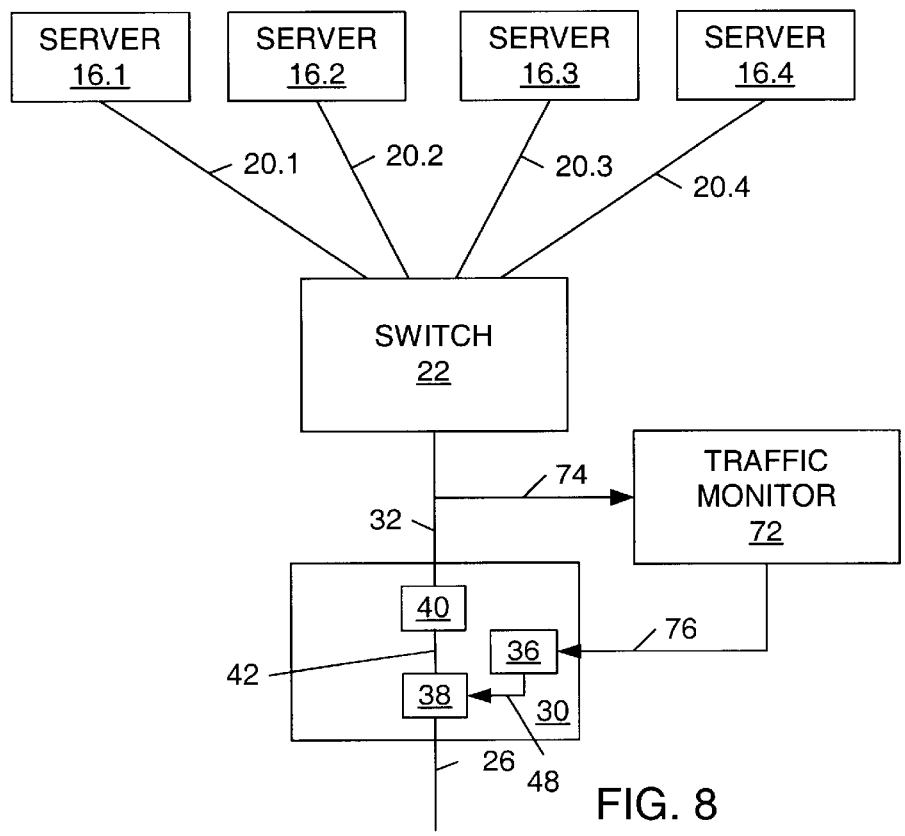
FIG. 8 is a schematic diagram for illustration another embodiment of the invention.

FIG. 8 is a schematic representation of an alternative embodiment where a traffic monitor 72 is provided separately from the dispatcher 30. In this case, the traffic monitor 72 monitors all message traffic over the link 32 and uses the source and destination information, along with a number of packets and/or the packet size information (61—FIG. 6), or other parameters to maintain one or more tables for the traffic flow to and/or from the server computers 16.1–16.4 over the respective links 20.1–20.4. In this case, the dispatch controller 36 is responsive to the table stored in the traffic monitor 72 in accordance with an appropriate algorithm to determine the dispatch of the in-bound client request to the individual server computers 16.1–16.4 via the respective links 20.1–20.4.

Figure 9:
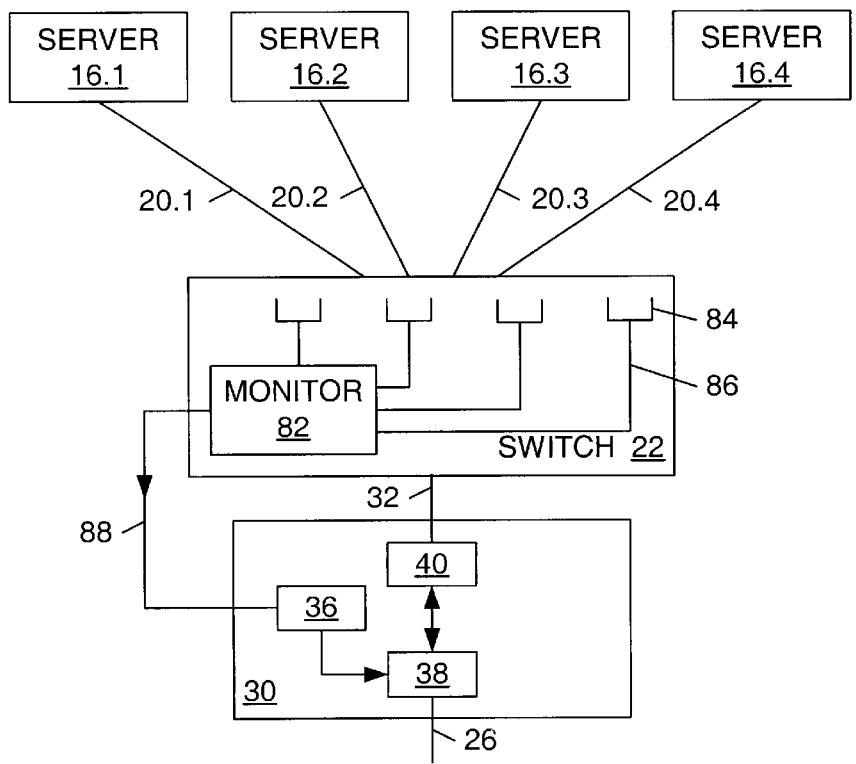
FIG. 9 is a schematic diagram illustrating a further embodiment of the present invention.

FIG. 9 is schematic representation of a further embodiment of the invention in which the traffic monitoring is performed in the switch 22. In this embodiment, a dispatch buffer monitor 82 is provided to monitor the individual dispatch buffers for the links 20.1–20.4 to identify dropped packets (ie. those packets which are unsuccessfully transmitted to the individual server computers 16.1–16.4 via the links 20.1–20.4, respectively). This embodiment assumes that there is a statistical relationship between the number of dropped packets and the occupancy (traffic) on the link concerned. Accordingly, the dispatch buffer monitor 82 monitors the error rate of the dispatch buffers 84 by logical connections 86 and provides information over a link 88 to the dispatch controller 36 indicative of the transmission error rate for each of the links 20.1–20.4. In the example of FIG. 9, the dispatch controller 36 is then responsive to the respective error rates indicated by the dispatch buffer monitor 82 to determine the allocation of requests received at the interface 38 from the external link 26.

Figure 10:
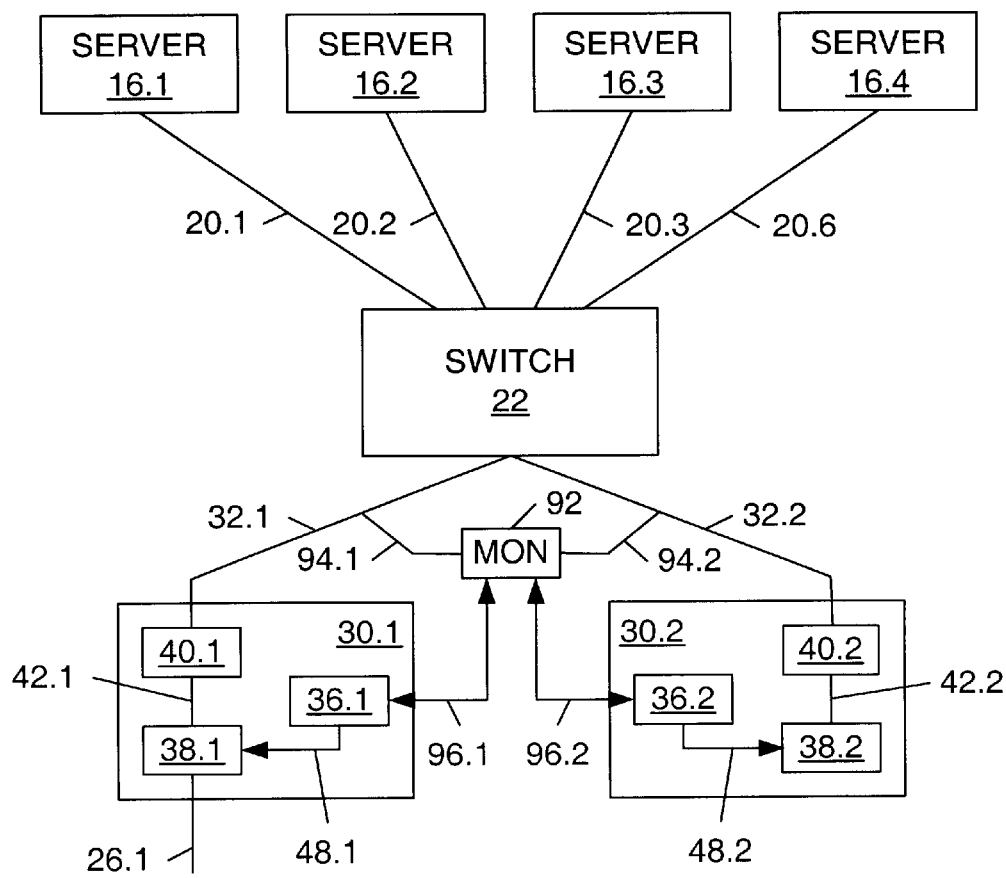
FIG. 10 is a schematic diagram illustrating yet a further embodiment of the present invention.

FIG. 10 is a further embodiment of the invention in which two dispatchers are provided in parallel. An arrangement as shown in FIG. 10 may be needed for high capacity network servers where a number of external connections are provided to the Internet or intranet. Each of the dispatchers 30.1 and 30.2 can be provided with respective Internet addresses, and they are connected to the individual server computers 16.1–16.4 via links 32.1 and 32.2, the switch 22 and the links 20.1–20.4. In this example, a traffic monitor 92 is provided which monitors the total traffic over the links 32.1 and 32.2 on the basis of the destination/source addresses as they relate to the server computers 16.1–16.4. In this manner, the common monitor 92 maintains an indication of the traffic over the individual links 20.1–20.4, respectively. The dispatch controllers 36.1 and 36.2 are responsive to the traffic information maintained by the traffic monitor 92 over respective links 96.1 and 96.2. Accordingly, the dispatch controllers 36.1 and 36.2 can provide allocation of in-bound requests over the links 26.1 and 26.2, respectively, on the basis of the traffic on the individual server network links 20.1–20.4 in a coordinated manner.

Figure 11:
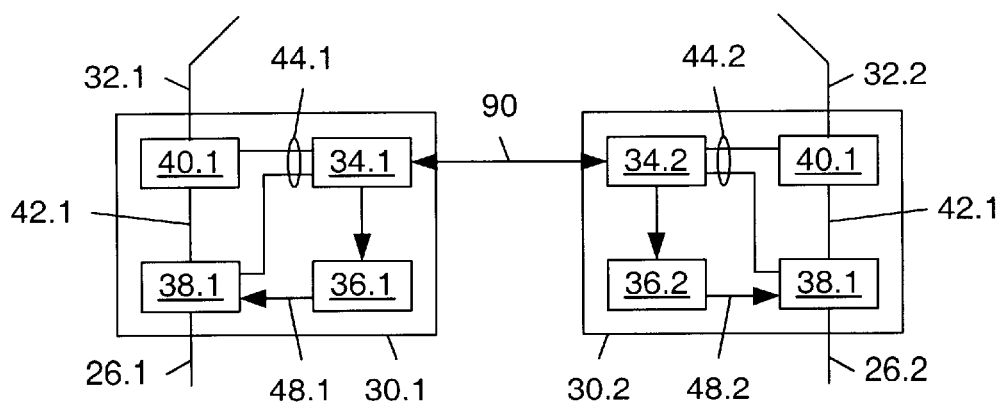
FIG. 11 is a schematic diagram illustrating a variant on the embodiment of FIG. 10.

FIG. 11 is a variant on the embodiment of FIG. 10 where a separate traffic monitor 34.1 and 34.2 is provided in each of the dispatchers 30.1 and 30.2, respectively. Each of the traffic volume monitors 34.1 and 34.2 can operate in essentially the same manner as that of the traffic monitor 34 of FIG. 4. However, in this case, it is necessary, in order to ensure that the dispatch controller 36.1 and 36.2 operate in a coordinated manner, that the traffic volume monitors 34.1 and 34.2 communicate between each other as represented by the two-way arrow 90. In other words, the traffic volume monitors 34.1 and 34.2 preferably pool the individual traffic volume data collected in order to keep the traffic volume data consistent in the dispatchers 30.1 and 30.2.

There have been described a number of embodiments of a message dispatch system for a multi-computer server for a computer network (for example for the Internet or an intranet) which provides load balancing on the basis of traffic flow at the edge of the server network. By providing load balancing on the basis of traffic flow, a better utilisation of network resources is possible in a modern processing environment than is possible with prior approaches. This results from the fact that the invention can take account of the total message flow including UDP and TCP type messages. Although in the described embodiments the message dispatching is on the basis of traffic flow alone, it will be appreciated that in a particular embodiment, traffic flow measurements could be combined with processor usage parameters in accordance with a desired algorithm. Although in such a case, the invention would use processor usage characteristics as have been known in the prior art, such an embodiment would still be characterised by the use of traffic flow measurements of an embodiment of the present invention.

An embodiment of the invention proposes not to assume that the network load is determined by the server computer activity, but to measure this load at the edge of the network. Based on this measurement, the dispatcher changes the destination IP address of a new connection to that of a system elected as the least loaded or at least to a server computer having a lower loading.

The full loading on the network can measured, even indirectly induced loading (e.g. multimedia UDP streams that are not using the same protocol as the original request) in an embodiment of the invention.

Although the particular embodiments of the invention described herein have four server computers, it will be appreciated that this is merely one possible example, and the number of server computers at a multi-computer server can have any number greater than one. Also, although in the embodiments shown, there is only one or possibly two dispatchers, it will be appreciated that in other examples, more than two dispatchers may be linked together for a multi-computer server.

In the present document reference is been made to server network links. It should however, be noted that the use of this term is not intended to imply that they are necessarily local links of a discrete network. The server network links do not need to be physically local, but could be physically distributed, possibly including links which do not extend directly between the dispatcher or switch and the individual server computers, but pass via one or more public lines and/or further switches.

Moreover, although in the described embodiments the switch is shown as a separate unique entity, this need not be the case. It could comprise a plurality of switches. Alternatively, the function of the switch could be incorporated into the dispatcher by providing the dispatcher with a plurality of separate output links directly to the server computers.

Accordingly, it will be appreciated that although particular embodiments of the invention have been described, many modifications/additions and/or substitutions may be made within the spirit and scope of the present invention as defined in the appended claims. With reference to those claims, it is to be noted that combinations of features of the dependent claims other than those explicitly enumerated in the claims may be made with features of other dependent claims and/or independent claims, as appropriate, within the spirit and scope of the present invention.

What is claimed is:

1. A message dispatch system for a multi-computer server which comprises a plurality of server computers having respective server network links, said message dispatch system being connectable to an external telecommunications network and comprising:
   a message dispatcher configured to receive external client requests for said multi-computer server from said external telecommunications network and to dispatch said client requests to selected server computers via said server network links;
   said message dispatcher being configured to determine one of said server computers to which one of said external client requests is to be dispatched in response to parameters representative of network loading on said server network links; and
   wherein said parameters comprise parameters representative of return traffic on said server network links.

2. The system of claim 1, comprising a switch connected to said message dispatcher, said switch being connected to each of said network server links.

3. The system of claim 2, wherein said message dispatcher mechanism is responsive to a record of traffic to and/or from individual server computers via said respective server network links, which record is maintained at said switch.

4. The system of claim 3, wherein said parameters comprise a count of message packets to and/or from said server computers on said respective server network links.

5. The system of claim 3, wherein said parameters comprise a count of message bytes to and/or from said server computers on said respective server network links.

6. The system of claim 3, wherein said record comprises a record of dropped message packets for said network servers links.

7. The system of claim 2, wherein said message dispatcher is responsive to a record of traffic to and/or from individual server computers via said respective server network links, which record is maintained at a traffic monitor connected to a connection between said message dispatcher and said switch.

8. The system of claim 7, wherein said parameters comprise a count of message packets to and/or from said server computers on said respective server network links.

9. The system of claim 7, wherein said parameters comprise a count of message bytes to and/or from said server computers on said respective server network links.

10. The system of claim 1, comprising a traffic monitor configured to monitor parameters representative of message traffic to and/or from individual server computers via said respective network server links, said message dispatcher being configured to receive said parameters from said traffic monitor.

11. The system of claim 10, wherein said traffic monitor is responsive to source address information in messages received from said server computers via said server network links to monitor the volume of traffic from said server computers on said respective server network links.

12. The system of claim 11, wherein said traffic monitor maintains a count of message packets from said server computers on said respective server network links.

13. The system of claim 11, wherein said traffic monitor comprises a count of message bytes from said server computers on said respective server network links.

14. The system of claim 10, wherein said traffic monitor is responsive to destination information for messages dispatched by said message dispatcher to said server computers via said server network links to monitor the volume of traffic to said server computers on said respective server network links.

15. The system of claim 14, wherein said traffic monitor maintains a count of message packets from said server computers on said respective server network links.

16. The system of claim 14, wherein said traffic monitor comprises a count of message bytes from said server computers on said respective server network links.

17. The system of claim 10, wherein said parameters comprise a count of message packets to and/or from said server computers on said respective server network links.

18. The system of claim 10, wherein said parameters comprise a count of message bytes to and/or from said server computers on said respective server network links.

19. The system of claim 1, wherein said message dispatcher is connected directly to said server network links.

20. The system of claim 1, wherein said message dispatcher is configured to modify a destination address of a received external client request for said multi-computer server from said external telecommunications network to address a selected one of said server computers.

21. The system of claim 1 configured to be addressable from said external telecommunications network by messages having an address of said multi-computer server.

22. The system of claim 1, wherein said telecommunications network is the Internet, said multi-computer server is an Internet server and said messages are Internet messages.

23. The system of claim 1, wherein said system is a software system configured to be operable on a computer connectable to the external telecommunications network such that said system is addressable by said multi-computer server address.

24. A method of dispatching received external client requests to server computers of a multi-computer server which comprises a plurality of server computers connected via respective server network links, said method comprising:

a) receiving external client requests for said multi-computer server from an external telecommunications network;

b) determining one of said server computers to which one of said external client requests is to be dispatched in response to parameters representative of network loading on said server network links, wherein said parameters comprise parameters representative of return traffic on said server network links; and c) dispatching one of said received client requests to said determined server computer via said respective server network link.

25. The method of claim 24, comprising an additional step of maintaining a record at said switch of traffic to and/or from individual server computers via said respective network server links.

26. The method of claim 25, wherein said record comprises a record of dropped message packets.

27. The method of claim 24, wherein said step (a) comprises receiving external client requests having an address of said multi-computer server from said external telecommunications network.

28. The method of claim 24, wherein said telecommunications network is the Internet, said multi-computer server is an Internet server and said messages are Internet messages.

29. The method of claim 24, further comprising monitoring traffic parameters representative of message traffic to and/or from individual server computers via said respective links, step (b) comprising a step of responding to said parameters.

30. The method of claim 24, wherein said parameters comprise a count of message packets to and/or from said server computers on said respective server network links.

31. The method of claim 24, wherein said parameters comprise a count of message bytes to and/or from said server computers on said respective server network links.

32. The method of claim 24, wherein said further step comprises responding to source address information in messages received from said server computers via said links to monitor the volume of traffic from said server computers on said respective server network links.

33. The method of claim 24, wherein said further step comprises responding to destination information for messages dispatched by said message dispatcher to said server computers via said links to monitor the volume of traffic to said server computers on said respective server network links.

34. The method of claim 24, comprising an extra step of maintaining a record, at a traffic monitor for a connection between said message dispatcher and said switch, of traffic to and/or from individual server computers via said respective links.

35. The method of claim 24, wherein step (c) comprises modifying a destination address of a received external client request for said multi-computer server from said external telecommunications network to address a selected one of said server computers.

36. A message dispatch system for a multi-computer server which comprises a plurality of server computers connected via respective server network links to a common switch, said message dispatch system being connectable to an external telecommunications network and comprising:

a first message dispatcher configured to receive external client requests for said multi-computer server from said external telecommunications network and to dispatch said client requests to selected server computers via said switch and said server network links; and at least one further message dispatcher configured to receive external client requests for said multi-computer server from said external telecommunications network and to dispatch said client requests to selected server computers via said switch and said server network links;

each message dispatcher being configured to determine one of said server computers to which one of said external client requests is to be dispatched in response to parameters representative of the network loading on said server network links; and wherein said parameters comprise parameters representative of return traffic on said server network links.

37. The system of claim 36, wherein each message dispatcher is response to a common set of parameters representative of network loading on said server network links.

38. The system of claim 37, wherein each message dispatcher is responsive to a respective set of parameters representative of network loading on said server network links, each dispatcher being responsive to each other dispatcher to coordinate message dispatching.

39. A computer software message dispatch system for a multi-computer server which comprises a plurality of server computers connected via respective server network links, wherein said computer software message dispatch system is provided on a data carrier, is configured to be connectable to an external telecommunications network and comprises:

a message dispatcher configured to receive external client requests for said multi-computer server from said external telecommunications network and to dispatch said client requests to selected server computers via said server network links;

said message dispatcher being configured to determine one of said server computers to which one of said external client requests is to be dispatched in response to parameters representative of network loading on said server network links; and wherein said parameters comprise parameters representative of return traffic on said server network links.

40. A message dispatch system for a multi-computer server which comprises a plurality of server computers having respective server network links, said message dispatch system being connectable to an external telecommunications network and comprising:

a message dispatcher configured to receive external client requests for said multicomputer server from said external telecommunications network and to dispatch said client requests to selected server computers via said server network links;

a traffic monitor configured to monitor parameters representative of network traffic to and/or from individual server computers via said respective network server links, said message dispatcher being configured to receive said parameters from said traffic monitor;

wherein said parameters comprise a count of message bytes to and/or from said server computers on said respective server network links;

wherein said message dispatcher is configured to determine one of said server computers to which one of said external client requests is to be dispatched in response to said parameters representative of network loading on said server network links;

wherein said traffic monitor is responsive to source address information in messages received from said server computers via said server network links to monitor the volume of traffic from said server computers on said respective server network links;

wherein said traffic monitor is responsive to destination information for messages dispatched by said message dispatcher to said server computers via said server network links to monitor the volume of traffic to said server computers on said respective server network links; and wherein said parameters comprise parameters representative of return traffic on said server network links.

* * * * *

UNITED STATES PATENT AND TRADEMARK OFFICE
CERTIFICATE OF CORRECTION

PATENT NO. : 6,263,368 B1
DATED : July 17, 2001
INVENTOR(S) : Jean-Christophe Martin It is certified that error appears in the above-identified patent and that said Letters Patent is hereby corrected as shown below:

<u>Column 13,</u>
Line 23, please change "claim 24" to -- claim 27 --.

Signed and Sealed this

Thirtieth Day of April, 2002

Attest:

*Attesting Officer*

JAMES E. ROGAN
*Director of the United States Patent and Trademark Office*